Dec. 19, 1961     P. H. BALSBAUGH     3,013,374
TREE LIMB SHAKER
Filed Nov. 20, 1958     2 Sheets-Sheet 1
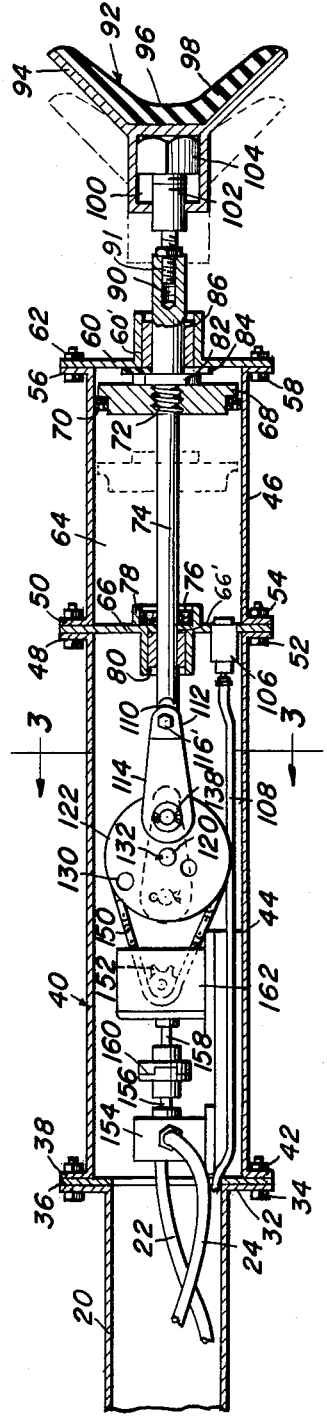
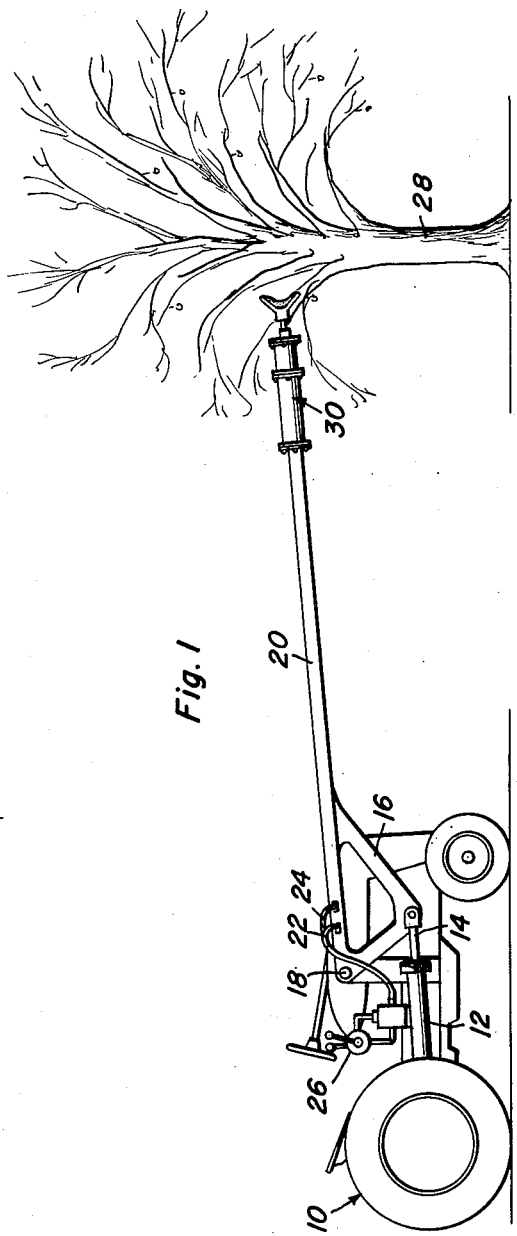
Paul H. Balsbaugh
INVENTOR.

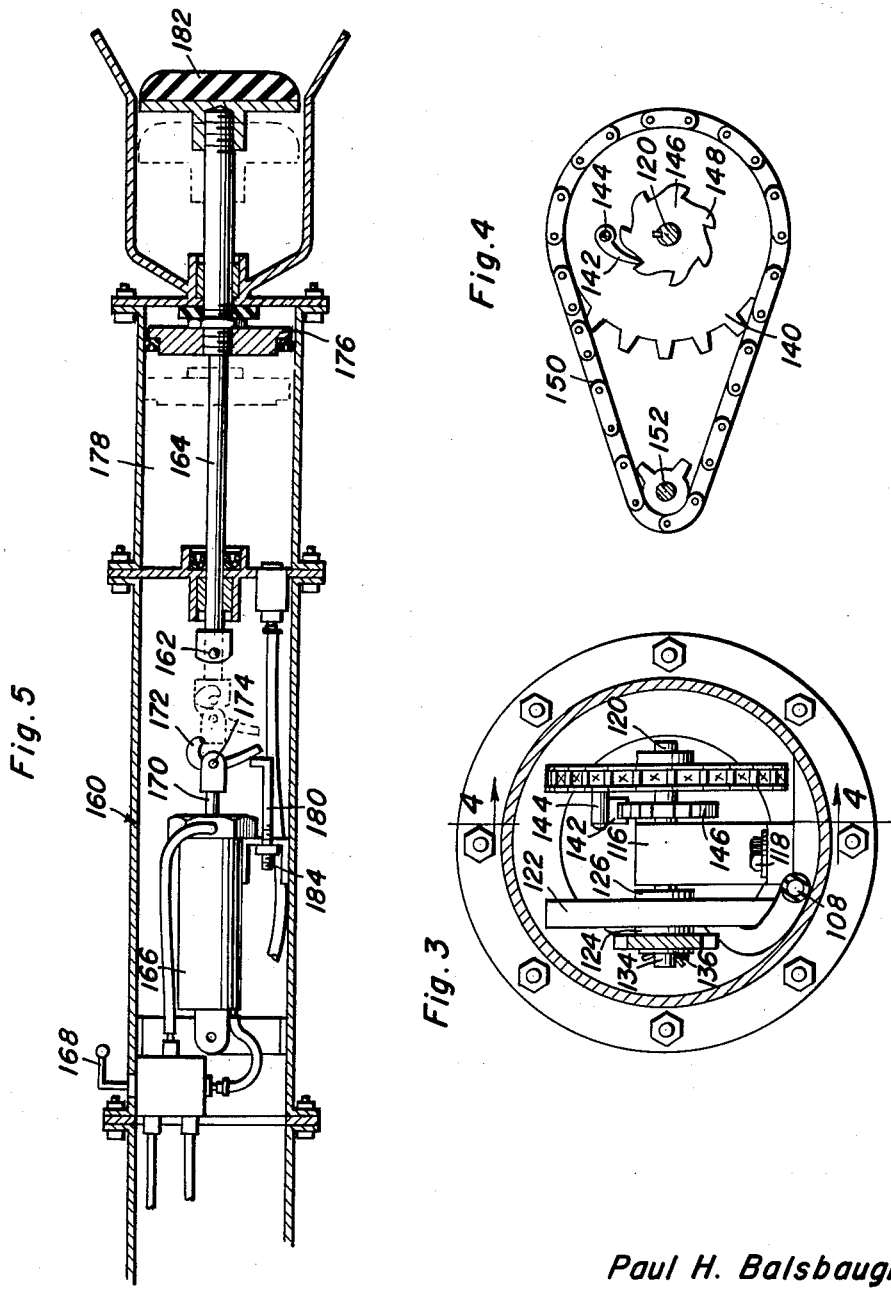

United States Patent Office 3,013,374
Patented Dec. 19, 1961

3,013,374
TREE LIMB SHAKER
Paul H. Balsbaugh, Rte. 3, Box 425, Modesto, Calif.
Filed Nov. 20, 1958, Ser. No. 775,226
10 Claims. (Cl. 56—328)

This invention relates generally to a harvesting device and more particularly to a device which may be utilized to shake trees or limbs of trees so as to cause the fruits or nuts thereof to fall to the ground.

In recent years there has been increased activity in the development of harvesting devices which efficiently enable a tree to be shook in such a manner whereby the fruit or nuts thereof will fall to the ground so they may be easily and inexpensively collected. Though this method of harvesting is clearly not novel, the applicant herein has developed a device which more simply and efficiently accomplishes the results desired than the devices taught by the prior art. Most of the devices known to the prior art and to the applicant utilize hydraulically motivated shafts reciprocably driven to shake trees and limbs. Invariably, these devices are mounted on some type of tractor means and hydraulic cylinders are utilized to raise and lower the boom carrying the tree shaker to appropriate heights. Though these devices taught by the prior art accomplish the results desired, they have been found to be complex and somewhat unreliable. Accordingly, the applicant herein has developed a novel device wherein trees and tree limbs may be shaken reliably and efficiently. More particularly, the applicant's device is characterized by its simplicity, reliability, and relative low expense.

It is the principal object of this invention to provide a novel harvesting device which is capable of shaking trees and the limbs thereof.

It is a further object of this invention to provide a novel harvesting device which is simpler, more reliable, and less expensive than the devices disclosed in the prior art.

It is a still further object of this invention to provide a harvesting device for shaking trees and limbs thereof which utilizes compressed air for driving a limb shaking shaft.

It is a still further object of this invention to provide tree shaking means which may be utilized on the end of a boom carried by a tractor-type device or which may be manually utilized by a man on foot.

In accordance with the above stated objects, below is particularly described the details of construction and operation of the novel harvesting device particularly developed and designed to reliably and efficiently shake limbs on the tree thereof. The device initially includes a casing having an air-tight cylindrical chamber therein. A piston is positioned in the cylindrical chamber and attached to a shaft which extends externally of the chamber. The shaft and piston are mounted for reciprocal movement within the cylindrical chamber. The casing includes, externally of the chamber, power means connected to the shaft for drawing the shaft and piston through the chamber whereby air in the chamber will be compressed. After the shaft and piston are drawn sufficiently rearwardly, the shaft and piston are released and driven forwardly by the compressed air. It should be noted that the air in the chamber is preferably under pressure at all times and the pressure is significantly further increased by the piston being drawn rearwardly in the chamber. The shaft carries externally of the casing, an impact head adapted to be brought to bear against a tree or limb. The impact is brought to bear against the tree as the compressed air drives the piston and shaft forwardly. The impact head utilized on the end of the shaft is constructed so as to lessen the impact and distribute the force so that an increased shaking movement results. The power means for withdrawing the shaft and piston through the chamber includes a connecting rod pivotally connected to the shaft and pivotally connected to a cam plate rotatably driven. The cam plate is fixed to a spindle which has a ratchet gear fixed thereto. A sprocket gear is mounted on the spindle but in a manner such that it is able to rotate freely with respect thereto. A pivotally mounted dog is carried on one face of the sprocket gear proximate the ratchet gear so that when the sprocket gear is driven, the dog will transmit the motion to the ratchet gear and thereby drive the spindle and cam plate. As the cam plate carries the connecting rod past the rear portion of its arc, the compressed air will force the piston, shaft, and connecting rod forward. This will cause a momentary rapid rotation of the cam plate, spindle, and ratchet gear. However, the ratchet gear will be able to rotate free of the pivotally mounted dog. The sprocket gear is preferably driven by a fluid motor and the entire device is contemplated to be supported at the end of a hydraulically operated boom.

In another embodiment of this invention utilizing the same concept, a manual tree or limb shaker is disclosed which utilizes a pivotally mounted hook on the end of a hydraulic piston for withdrawing the shaft and piston through the air-tight cylindrical chamber. The pivotally mounted hook engages a boss at the rear end of the shaft. A projection in the casing is positioned in the path of travel of the hook and upon contact therewith pivots the hook so as to disengage it from the boss on the shaft whereby the compressed air will force the piston and shaft forwardly and an impact head terminally carried by the shaft will shake the limb and tree.

In both embodiments, a compressed air supply should be available with which to fill the cylindrical chamber. However, it is to be noted that no exhaust ports are provided in the chamber and it is contemplated that the same air be compressed and re-compressed. However, the compressed air supply should be available to compensate for inevitable leakage from the chamber. Check valve means are therefore included in the chamber wall with the check valve means communicating through an air line to the compressed air supply.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view illustrating a conventional tractor-type vehicle adapted to carry a hydraulically operated boom which in turn may carry the device comprising this invention;

FIGURE 2 is a longitudinal sectional view illustrating the inner construction of the invention;

FIGURE 3 is an enlarged sectional view taken substantially along the plane 3—3 of FIGURE 2;

FIGURE 4 is a sectional view taken substantially along the plane 4—4 of FIGURE 3; and FIGURE 5 is a longitudinal sectional view illustrating a second embodiment of the invention.

With continuing reference to the drawings and initial reference to FIGURE 1, numeral 10 generally represents a conventional tractor. However, for the purposes of properly utilizing the device taught in this application, the tractor is equipped with a hydraulic cylinder 12 adapted to linearly move the piston 14 for pivoting the frame 16 about a pivot point 18. The frame supports a tubular boom 20 which carries the cables as at 22 and 24 from the manual control means 26 to the interstices of the invention generally designated as at 30 terminally carried by the boom 20. FIGURE 1 illustrates the invention 30 in position to shake proximate tree 28.

Referring now to FIGURE 2, the boom 20 is illustrated as having a flange 32 having apertures therethrough for receiving bolts 34 adapted to pass through gasket 36 and flange 38 of casing 40 for receiving nuts 42 thereon. The casing 40 is illustrated as including a first section 44 and a second section 46. Flanges 48 and 50 have apertures therethrough which accommodate bolts 52 receiving nuts 54 for securing the casing sections 44 and 46 in tandem. A flange 56 on section 46 receives bolt 58 therethrough to secure closure member 60 thereon by nut 62.

Initially referring to section 46 of casing 40, it will be noted that the casing defines a chamber 64 within the casing walls, closure member 60, and partition 66. Within the chamber 64 is a piston 68 carrying air seals 70. The piston 68 has a threaded central aperture for receiving the external threads 72 of a shaft 74. The shaft 74 extends rearwardly through the casing and forwardly externally of the casing. Rearwardly, it passes through an aperture 66' in partition 66 through air seal 76 supported in a well formed by walls 78 on the partition 66. Further supported on the partition 66, externally of the chamber 64, is a bearing 80 through which the shaft 74 is adapted to slide. A jam nut 82 is secured on the shaft 74 adjacent the piston 68 for locking the piston to the shaft 74. A cushioning member 84 is secured to the closure member 60 within the chamber 64 and is adapted to absorb the impact of jam nut 82 on closure member 60. The closure member 60 has an aperture 60' therein and in which shaft 74 is disposed for sliding movement. A bearing 86 is disposed in the aperture between member 60 and shaft 74 to permit efficient sliding relative motion between the shaft 74 and closure member 60.

The shaft 74 terminally includes a threaded bore 90 adapted to threadedly receive the threaded cylindrical portion 91 of impact head 92. The impact head 92 includes a shoe portion 94 having an indented portion 96 which is padded with rubber or such 98 for the purpose of protecting the bark of the tree 28. A rear passage 100 receives the connecting cylinder 102 and the nut 104 threadedly engaged therewith. It is to be noted that the shoe 94 is adapted to slide with respect to the connecting cylinder 102 and nut 104. Therefore, it is evident that the shoe 94 is also adapted to slide relative to the shaft 74.

A check valve 106 is supported by the partition 66 and communicates with the air-tight chamber 64. An air line 108 is connected to the check valve 106 and is adapted to carry compressed air from a compressed air supply (not shown) to the air-tight chamber 64. It will here be noted that no exhaust ports are provided to allow air to escape from the chamber 64 and air may only escape incidentally through improper fitting parts.

Within the casing section 44, power means are provided for drawing the shaft 74 and piston 68 rearwardly through the chamber 64. The shaft 74 terminates at its rear portion in a flat portion 110 which has an aperture therethrough adapted to be aligned with apertures passing through the bifurcated portions 112 of connecting rod 114. A bolt 116' passes through the aligned apertures and is therein fixed to allow pivotal movement between the shaft 74 and connecting rod 114. A pillar block 116 is fixed to the casing by bolt 118 and rotatably supports a spindle 120 therethrough. A cam plate 122 is fixed to the spindle 120 and positively positioned thereon by spacers 124 and 126. The cam plate 122 has a plurality of apertures as at 130 in the face thereof at varying distances from the center of the cam plate. The spindle 120 passes through the center of the cam plate 122 and a key 132 fixes the cam plate 122 to the spindle 120. A pin 134 is adapted to be received within an aperture 130 in cam plate 122 and is further adapted to be received within an aperture in the connecting rod 114. A cotter pin 136 is utilized to secure a washer 138 adjacent the connecting rod 114 and to secure the connecting rod 114 pivotally to the cam plate 122. From the structure so far recited, it should be apparent that if the spindle 120 is rotatably driven, the cam plate 122 will turn and carry the pin 134 around the spindle 120. Since the connecting rod 114 is pivoted to the cam plate 122 by the pin 134 and since the connecting rod 114 is pivoted to the shaft 74 by bolt 116, it is apparent that the shaft 74 may be drawn rearwardly by a counterclockwise movement of the spindle 120 as viewed in FIGURE 2. It is noted that the shaft 74 is constrained from anything but reciprocal movement through the partition 66, by the bearing 80.

Freely rotatably carried by the spindle 120 is a sprocket gear 140. The sprocket gear 140 has a dog 142 pivotally mounted by screw 144 on the face thereof. Keyed to the spindle 120 adjacent the sprocket gear 142 is a ratchet gear 146. Particular attention is directed now toward FIGURE 3 and 4 wherein it is noted that the pivotally mounted dog 142 is positioned proximate the teeth 148 of the ratchet gear 146 so that the dog 142 may drive the ratchet gear 146 in a counterclockwise direction as the sprocket gear 140 is driven counterclockwise Also, attention is drawn to the fact that while a counterclockwise movement of the freely rotatably supported sprocket gear 140 will drive the ratchet gear 146 and spindle 120 counterclockwise, a counterclockwise movement of the ratchet gear 146 will not have a driving effect upon the sprocket gear 140. An endless sprocket chain 150 connects sprocket gear 152 to sprocket gear 140. The sprocket gear 152 is illustrated as being driven from a hydraulic motor 154 which has a shaft 156 coupled to a shaft 158 through coupling 160. The shaft 158 drives gears within a gear reduction box 162 for imparting a counterclockwise motion to the sprocket gear 152 as viewed in FIGURE 4 to drive the sprocket chain 150 and sprocket gear 140 counterclockwise.

In the operation and utilization of this embodiment, the hydraulic motor 154 is, as is noted above, adapted to drive the sprocket gear 152 in a counterclockwise direction. When using the device, compressed air is forced into the air-tight chamber 64 with the piston 68 in the solid line position as illustrated in FIGURE 2. When the compressed air in the chamber 64 is equal in pressure to the pressure of the air in the compressed air supply (not shown) the check valve 106 will close. The counterclockwise rotation of sprocket gear 152 will drive the sprocket gear 140 counterclockwise and will force the dog 142 to drive the spindle 120 counterclockwise through ratchet wheel 146. Accordingly, the cam plate 122 will be driven counterclockwise and will draw the connecting rod 114 rearwardly. This action will draw the shaft 74 rearwardly carrying the piston 68 therewith. Of course, the compressed air in the chamber 64 will become further compressed. As the cam plate 122 draws the connecting pin 134 and connecting rod 114 past the rear portion of its arc, the highly compressed air in the chamber 64 will force the piston 68 and shaft 74 forwardly. As is particularly noted in FIGURE 4, the ratchet gear 146 and spindle 120 may rotate counterclockwise relative to the sprocket gear 140. Attention is here directed to FIGURE 2 wherein the dotted line position of the connecting rod 114 illustrates the position of the connecting rod instantaneously before forward motion is started. Likewise, the dotted line position of piston 68 and impact head 92 indicate the respective rear positions. As the shaft 74 is driven forwardly, the connecting cylinder 102 and nut 104 ride forwardly in passage 100 of shoe 94. The free travel between the connecting cylinder 102 and shoe 94 instilled by the utilization of the passage 100 allows for a distribution of the impact so as to provide a shaking motion on the limb or tree other than merely impact.

It is thought that the above should clearly explain to one skilled in the art the intricacies of operation and construction relative to the embodiment of this invention illustrated in FIGURES 1 through 4.

Now particularly directing attention to FIGURE 5, numeral 160 designates a tree or limb shaker which may be manually utilized by a man on foot. The invention is similar to the embodiment above disclosed but however introduces new power drawing and releasing means which are less complex than the sprocket gear, spindle, and ratchet gear utilized above. A boss 162 is fixed on the rear portion of the shaft 164. A hydraulic cylinder 166 having manual control means 168 is secured in the rear portion of the casing. The piston 170 of the hydraulic cylinder 166 carries a hook 172 pivotally secured thereto by bolt 174. The normal position of the hydraulic piston 170 causes it to be extended forwardly of the device 160 whereby the hook 172 will engage the boss 162 of shaft 164. Upon manual actuation through control 168 of cylinder 166, the piston 170 will be withdrawn into the cylinder 166 and the hook 172 will draw the boss 162 and shaft 164 rearwardly. The piston 176 fixed to the shaft 164 will of course further compress the compressed air in chamber 178. As the piston 170 of the hydraulic cylinder 166 is withdrawn it will contact projection 180 which will pivot the hook 172 about the pivotal point 174 thereby disengaging the hook 172 from the boss 162 allowing the compressed air in the chamber 178 to force the piston 176 and shaft 164 forwardly. The shaft 164 terminally carries thereon externally of the casing a padded impact head 182 for contacting the tree or limb to shake the tree or limb without harming the bark thereof. It will be noted that the projection 180 is terminally threaded at 184 and thereby adjustably supported within the casing. The adjustability of the projection 180 regulates the point at which the hook 172 becomes disengaged from the boss 162 on the shaft 164. It will be apparent of course that the particular adjustment of the projection 180 will determine the stroke length of the shaft 164 and impact head 182 as the shaft 164 reciprocates within the casing. The adjustability of the projection 180 within the casing is clearly analogous to the selectivity indicated in the embodiment above disclosed wherein the connecting pin 134 may be utilized in any of a plurality of apertures 130 and cam plate 122 for adjusting the stroke length of shaft 74.

It is thought that the above apparently clearly explains to one skilled in the art the proper construction and operation of the two embodiments below claimed. Though conventional parts have not been fully disclosed, it is considered that the concept of the invention has been clearly and sufficiently disclosed whereby one skilled in the art may fully comprehend and reproduce the teachings therein.

In the modification shown in FIGURE 2, the chain 150, the sprocket 140, the drive shaft 120, the connecting rod 114 and the pin connecting the connecting rod 114 to the cam plate 122 comprise a drawing means for drawing or pulling the piston rod 74 and piston 68 rearwardly in the cylinder 46. The drawing means may also include the releasing means 144, 142 and 146 shown in FIGURE 4. In the modification shown in FIGURE 5, the drawing means and the releasing means both include the members 174, 172 and 162. In FIGURE 5, the stop member 180 also includes part of the releasing means. In FIGURE 2, the pin connecting the members 114 and 74 comprise a connecting means, and the motion imparting means includes the motor 154 with its shaft 156 and coupling 160.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A harvesting device to be utilized to shake tree limbs comprising a casing defining an air-tight sealed cylindrical chamber therein, a piston in said cylindrical chamber, a shaft mounted for reciprocal motion fixed to said piston extending externally of said chamber, power means directly connected to said shaft for positively drawing said shaft and piston through said chamber to compress air in the cylinder between one end thereof and the piston, and means in said casing for automatically releasing said shaft from said power means whereby said shaft may be driven forward by said compressed air in said sealed cylindrical chamber, and means connected to said shaft adapted to engage a tree limb for shaking same and having a smooth limb engaging surface.

2. A harvesting device to be utilized to shake tree limbs comprising a casing, said casing having therein an air-tight cylindrical chamber, a piston in said cylindrical chamber, a shaft mounted for reciprocal motion fixed to said piston extending externally of said chamber, drawing means independent of the tree limbs operatively connected to said shaft for positively drawing said shaft and piston through said chamber to compress air therein, and releasing means in said casing connected to said drawing means for automatically releasing said shaft whereby said shaft may be driven forward by said compressed air, said drawing means including a connecting rod pivotally and directly connected to said shaft, a cam plate, connecting means pivotally connecting said connecting rod to said cam plate and motion imparting means for rotating said cam plate for reciprocating said piston mechanically.

3. A harvesting device to be utilized to shake tree limbs comprising a casing, said casing having therein an air-tight cylindrical chamber, a piston in said cylindrical chamber, a shaft mounted for reciprocal motion fixed to said piston extending externally of said chamber, a limb engaging member connected to the external portion of said shaft, drawing means independent of the tree limbs operatively connected to said shaft for positively drawing said shaft and piston through said chamber to compress air therein, and releasing means in said casing for automatically releasing said shaft whereby said shaft may be driven forward by said compressed air, said drawing means including a connecting rod pivotally connected to said shaft, a cam plate, connecting means for pivotally connecting said connecting rod to said cam plate and motion imparting means for rotating said cam plate, said connecting means including a connecting pin, a plurality of apertures defined within said cam plate at varying distances from the center of said plate adapted to receive said pin, an aperture in said rod adapted to receive said pin.

4. A harvesting device to be utilized to shake tree limbs comprising a casing, said casing having therein an air-tight cylindrical chamber, a piston in said cylindrical chamber, a shaft mounted for reciprocal motion fixed to said piston extending externally of said chamber, a limb engaging member connected to the external portion of said shaft, drawing means independent of the tree limbs operatively connected to said shaft for positively drawing said shaft and piston through said chamber to compress air therein, and releasing means in said casing for automatically releasing said shaft whereby said shaft may be driven forward by said compressed air, said drawing means including a connecting rod pivotally connected to said shaft, a cam plate, connecting means for pivotally connecting said connecting rod to said cam plate and motion imparting means for rotating said cam plate, said connecting means including a connecting pin, a plurality of apertures defined within said cam plate at varying distances from the center of said plate adapted to receive said pin, an aperture in said rod adapted to receive said pin, said motion imparting means including a spindle rotatably supported in said casing, said cam plate fixed to said spindle.

5. A harvesting device to be utilized to shake tree limbs comprising a casing, said casing having therein an air-tight cylindrical chamber, a piston in said cylindrical chamber, a shaft mounted for reciprocal motion fixed to said piston extending externally of said chamber, a limb engaging member connected to the external portion of said shaft, drawing means independent of the tree limbs operatively connected to said shaft for positively drawing said shaft and piston through said chamber to compress air therein, and releasing means in said casing for automatically releasing said shaft whereby said shaft may be driven forward by said compressed air, said drawing means including a connecting rod pivotally connected to said shaft, a cam plate, connecting means for pivotally connecting said connecting rod to said cam plate and motion imparting means for rotating said cam plate, said connecting means including a connecting pin, a plurality of apertures defined within said cam plate at varying distances from the center of said plate adapted to receive said pin, an aperture in said rod adapted to receive said pin, said motion imparting means including a spindle rotatably supported in said casing, said cam plate fixed to said spindle, a first freely rotatable gear supported on said spindle, a second gear, said second gear fixed to said spindle and adapted to be driven by said first gear.

6. A harvesting device to be utilized to shake tree limbs comprising a casing, said casing having therein an air-tight cylindrical chamber, a piston in said cylindrical chamber, a shaft mounted for reciprocal motion fixed to said piston extending externally of said chamber, a limb engaging member connected to the external portion of said shaft, drawing means independent of the tree limbs operatively connected to said shaft for positively drawing said shaft and piston through said chamber to compress air therein, and releasing means in said casing for automatically releasing said shaft whereby said shaft may be driven forward by said compressed air, said drawing means including a connecting rod pivotally connected to said shaft, a cam plate, connecting means for pivotally connecting said connecting rod to said cam plate and motion imparting means for rotating said cam plate, said connecting means including a connecting pin, a plurality of apertures defined within said cam plate at varying distances from the center of said plate adapted to receive said pin, an aperture in said rod adapted to receive said pin, said motion imparting means including a spindle rotatably supported in said casing, said cam plate fixed to said spindle, a first freely rotatable gear supported on said spindle, a second gear, said second gear fixed to said spindle and adapted to be driven by said first gear, said releasing means including a pivotally supported dog carried on a face of said first gear, said second gear being a ratchet gear, said dog positioned proximate said ratchet gear for driving said ratchet gear, said ratchet gear being able to rotate in a selective direction free of said dog when said compressed air drives said shaft forward.

7. A harvesting device to be utilized to shake tree limbs comprising a casing, said casing having therein an air-tight cylindrical chamber, a piston in said cylindrical chamber, a shaft mounted for reciprocal motion fixed to said piston extending externally of said chamber drawing means independent of the tree limbs operatively connected to said shaft for positively drawing said shaft and piston through said chamber to compress air therein, and releasing means in said casing for automatically releasing said shaft whereby said shaft may be driven forward by said compressed air, said drawing means including a connecting rod pivotally connected to said shaft, a cam plate, connecting means for pivotally connecting said connecting rod to said cam plate and motion imparting means for rotating said cam plate, said connecting means including a connecting pin, a plurality of apertures defined within said cam plate at varying distances from the center of said plate adapted to receive said pin, an aperture in said rod adapted to receive said pin, said motion imparting means including a spindle rotatably supported in said casing, said cam plate fixed to said spindle, a first freely rotatable gear supported on said spindle, a second gear, said second gear fixed to said spindle and adapted to be driven by said first gear, said releasing means including a pivotally supported dog carried on a face of said first gear, said second gear being a ratchet gear, said dog positioned proximate said ratchet gear for driving said ratchet gear, said ratchet gear being able to rotate in a selective direction free of said dog when said compressed air drives said shaft forward, and an impact head terminally carried by said shaft.

8. A harvesting device to be utilized to shake tree limbs comprising a casing, an air-tight cylindrical chamber in said casing, a piston in said cylindrical chamber, a shaft mounted for reciprocal motion fixed to said piston extending externally of said chamber drawing means operatively connected to said shaft for positively drawing said shaft and piston through said chamber to compress air therein, and releasing means in said casing for automatically releasing said shaft whereby said shaft may be driven forward by said compressed air, said drawing means including a connecting rod pivotally connected to said shaft, a cam plate, connecting means for pivotally connecting said connecting rod to said cam plate and motion imparting means for rotating said cam plate, said connecting means including a connecting pin, a plurality of apertures defined within said cam plate at varying distances from the center of said plate adapted to receive said pin, an aperture in said rod adapted to receive said pin, said motion imparting means including a spindle rotatably supported in said casing, said cam plate fixed to said spindle, a first freely rotatable gear supported on said spindle, a second gear, said second gear fixed to said spindle and adapted to be driven by said first gear, said releasing means including a pivotally supported dog carried on a face of said first gear, said second gear being a ratchet gear, said dog positioned proximate said ratchet gear for driving said ratchet gear, said ratchet gear being able to rotate in a selective direction free of said dogs when said compressed air drives said shaft forward, and an impact head terminally carried by said shaft, said impact head including a passage, a nut fixed to the terminal portion of said shaft, said nut and said shaft adapted to longitudinally move in said passage whereby the impact head may shake a tree limb while providing impact.

9. A harvesting device to be utilized to shake tree limbs comprising a casing defining an air-tight cylindrical chamber, a piston in said cylindrical chamber, a shaft mounted for reciprocal motion fixed to said piston extending externally of said chamber, drawing means operatively connected to said shaft for positively drawing said shaft and piston through said chamber to compress air therein, and releasing means in said casing for automatically releasing said positive drawing means from said shaft whereby said shaft may be driven forward by said compressed air, said drawing means including a hydraulic piston, a boss terminally carried by said shaft, a pivotally supported hook carried by said hydraulic piston adapted to engage said boss.

10. A harvesting device to be utilized to shake tree limbs comprising a casing defining an air-tight cylindrical chamber, a piston in said cylindrical chamber, a shaft mounted for reciprocal motion fixed to said piston extending externally of said chamber, drawing means operatively connected to said shaft for positively drawing said shaft and piston through said chamber to compress air therein, and releasing means in said casing for automatically releasing said positive drawing means from said shaft whereby said shaft may be driven forward by said compressed air, said drawing means including a hydraulic piston, a boss terminally carried by said shaft, a pivotally supported hook carried by said hydraulic piston adapted to engage said boss, said releasing means including an adjustably supported projection in said casing, said projection positioned in the path of travel of said hook for pivoting said hook upon contact therewith for disengaging the hook from the boss.

References Cited in the file of this patent

UNITED STATES PATENTS

| | | |
|---|---|---|
| 1,472,262 | Abildgaard | Oct. 30, 1923 |
| 1,477,684 | Berner | Dec. 18, 1923 |
| 1,626,068 | Bartlett | Apr. 26, 1927 |
| 2,729,199 | Jones | Jan. 3, 1956 |
| 2,769,298 | Jones | Nov. 6, 1956 |